United States Patent [19]

Yoshida et al.

[11] Patent Number: 5,631,558

[45] Date of Patent: *May 20, 1997

[54] APPARATUS AND METHOD FOR MEASURING VELOCITY AND INSTANTANEOUS SPATIAL POSITION OF SPHERICAL OBJECT SIULTANEOUSLY

[75] Inventors: Kazunari Yoshida, Kasai; Shinji Ohshima, Akashi; Takashi Teraguchi, Kakogawa, all of Japan

[73] Assignee: Sumitomo Rubber Industries, Ltd., Kobe, Japan

[ * ] Notice: The term of this patent shall not extend beyond the expiration date of Pat. No. 5,479,008.

[21] Appl. No.: 421,792

[22] Filed: Apr. 14, 1995

[30] Foreign Application Priority Data

Apr. 18, 1994 [JP] Japan .................... 6-104868

[51] Int. Cl.$^6$ ................ G01P 3/68; A63B 69/36
[52] U.S. Cl. .................... 324/178
[58] Field of Search ............... 324/178, 175; 340/323 R; 273/181 H, 185 R, 187.3, 185 A, 29 R

[56] References Cited

U.S. PATENT DOCUMENTS

| | | | |
|---|---|---|---|
| 4,542,906 | 9/1985 | Takase et al. | 273/185 R |
| 4,872,687 | 10/1989 | Dooley | 273/185 R |
| 4,915,384 | 4/1990 | Ben | 273/26 R |
| 4,941,662 | 7/1990 | DePerna | 273/25 |
| 5,059,944 | 10/1991 | Carmona | 340/323 R |
| 5,067,718 | 11/1991 | Knox et al. | 273/185 R |
| 5,333,874 | 8/1994 | Arnold et al. | 273/185 B |
| 5,437,457 | 8/1995 | Curchod | 273/185 A |
| 5,479,008 | 12/1995 | Nishiyama et al. | 250/222.1 |

Primary Examiner—Walter E. Snow
Assistant Examiner—Roger Phillips
Attorney, Agent, or Firm—Armstrong, Westerman, Hattori, McLeland & Naughton

[57] ABSTRACT

An apparatus and a method for simultaneously measuring velocity and an instantaneous spatial position of a spherical object. A first group of sensors and a second ground of sensors are arranged at known positions at intervals each less than the radius of the spherical object. The times when the spherical object begins to intercept the sensors of the groups of sensors and the time lengths of the respective interceptions are measured by using an instrumentation device. The velocity and instantaneous spatial position of the spherical object are calculated by using an arithmetic unit on the basis of the measured times and time lengths.

9 Claims, 6 Drawing Sheets

APPARATUS AND METHOD FOR MEASURING VELOCITY AND INSTANTANEOUS SPATIAL POSITION OF SPHERICAL OBJECT SIULTANEOUSLY

BACKGROUND OF THE INVENTION

1. Field of the Invention

The present invention relates to an apparatus and a method for simultaneously measuring velocity and an instantaneous spatial position of a spherical object.

2. Description of the Related Art

In a conventional method, flying velocity and a passing position of a spherical object such as a golf ball or a tennis ball are measured by using groups of sensors arranged at definite intervals along the flying direction of the ball and allowing the ball to intercept light of a plurality of ray projecting and receiving systems of the groups of sensors. The interval between the time when the spherical object begins to intercept light of a ray projecting and receiving system of a group of sensors and the time when the spherical object begins to intercept light of a ray projecting and receiving system of another group of sensors is measured, and the velocity of the spherical object is obtained from the time interval and the distance between the ray projecting and receiving systems, and the passing position of the spherical object is obtained from the position of the first ray projecting and receiving system intercepted by the spherical object.

Figure 6:
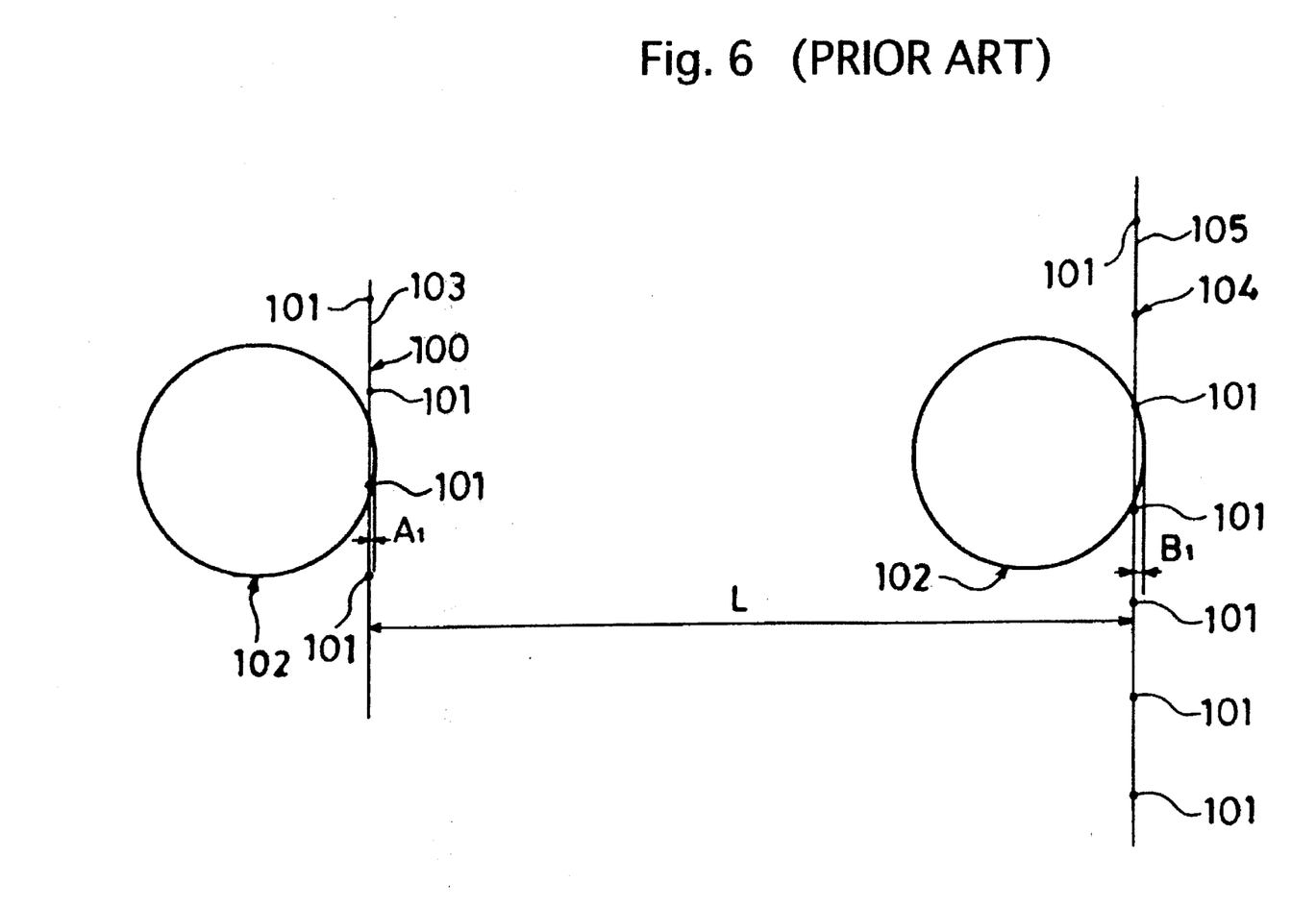
FIG. 6 is an explanatory view of a conventional method.

In the conventional method, as shown in FIG. 6, part of the spherical object 102 protrudes beyond the base line 103 of a group of sensors 100 when a sensor 101 of the group of sensors 100 is intercepted, and part of the spherical object 102 protrudes beyond the base line 105 of another group of sensors 104 when a sensor 101 of the group of sensors 104 is intercepted.

In other words, if the distance the spherical object 102 protrudes beyond the base line 103 of the group of sensors 100 is defined as $A_1$, the distance the spherical object 102 protrudes beyond the base line 105 of the group of sensors 104 is defined as $B_1$, and the interval from the time a sensor 101 of the group of sensors 100 is intercepted to the time a sensor 101 of the group of sensors 104 is intercepted is defined as T, the spherical object 102 practically moved for $L-A_1+B_1$ in T seconds. L is the distance between the groups of sensors 100 and 104.

In the foregoing conventional method, the velocity and position of the spherical object 102 are calculated on the basis of the distance L for which the spherical object 102 is supposed to have moved instead of the distance the spherical object 102 practically moved, therefore the velocity and position obtained by using the conventional method are not accurate.

It is therefore an object of the present invention to provide an apparatus and a method for measuring velocity and an instantaneous spatial position of a spherical object simultaneously, in which velocity and a position of a moving (including flying) spherical object are measured with high accuracy.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
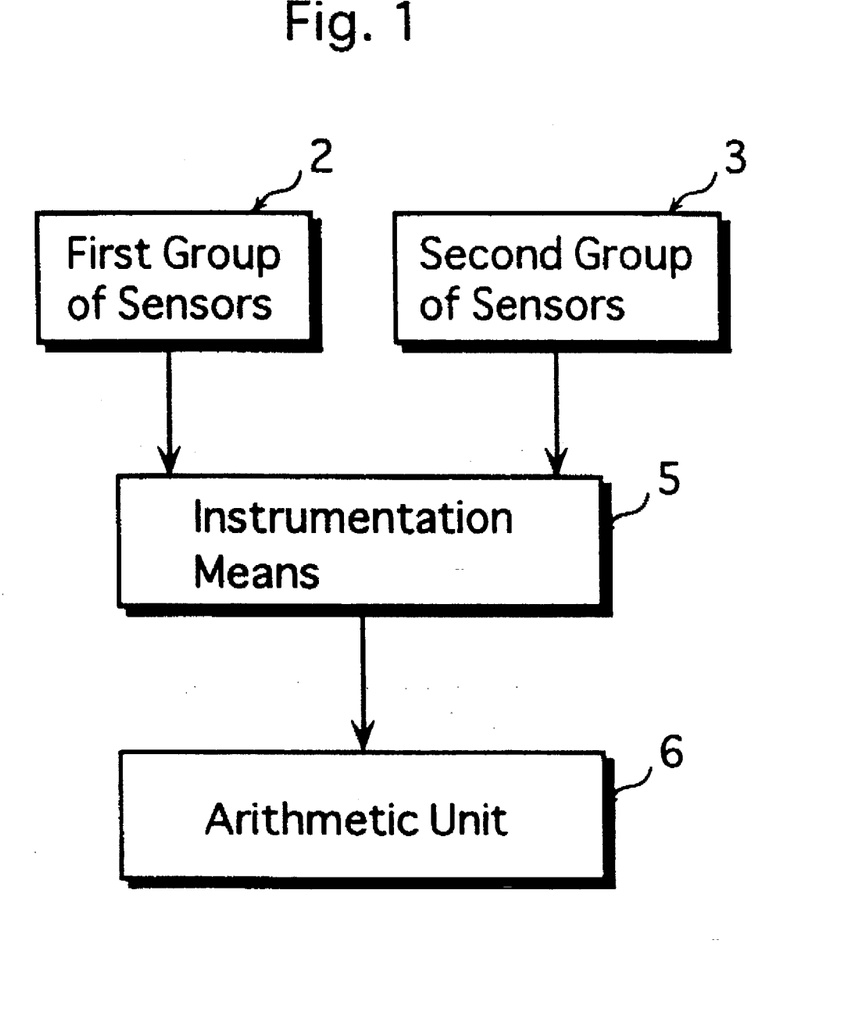
FIG. 1 is a block diagram showing an embodiment of the apparatus for measuring velocity and an instantaneous spatial position of a spherical object simultaneously according to the present invention.

FIG. 1 is a block diagram of an apparatus for measuring velocity and an instantaneous spatial position of a spherical object simultaneously according to the present invention, and this apparatus is provided with a first group of sensors 2 consisting of a plurality of sensors 1 (see FIG. 2), a second group of sensors 3 consisting of a plurality of sensors 1, an instrumentation means 5 for measuring the various times when a spherical object 4 (for example, a golf ball or a tennis ball) begins to intercept the sensors 1 of the groups of sensors 2, 3 and the time lengths of the respective interceptions, and an arithmetic unit 6 for calculating the velocity and instantaneous spatial position of the spherical object 4 on the basis of the measured times and time lengths.

The sensors 1 are light sensors detecting light from ray projecting means (projectors) (not shown in the attached drawings) arranged to be corresponding to the sensors 1. When the spherical object 4 is above a sensor 1 and intercepts a ray of light from a projector into the sensor 1, the sensor 1 detects the interception of light.

Figure 2:
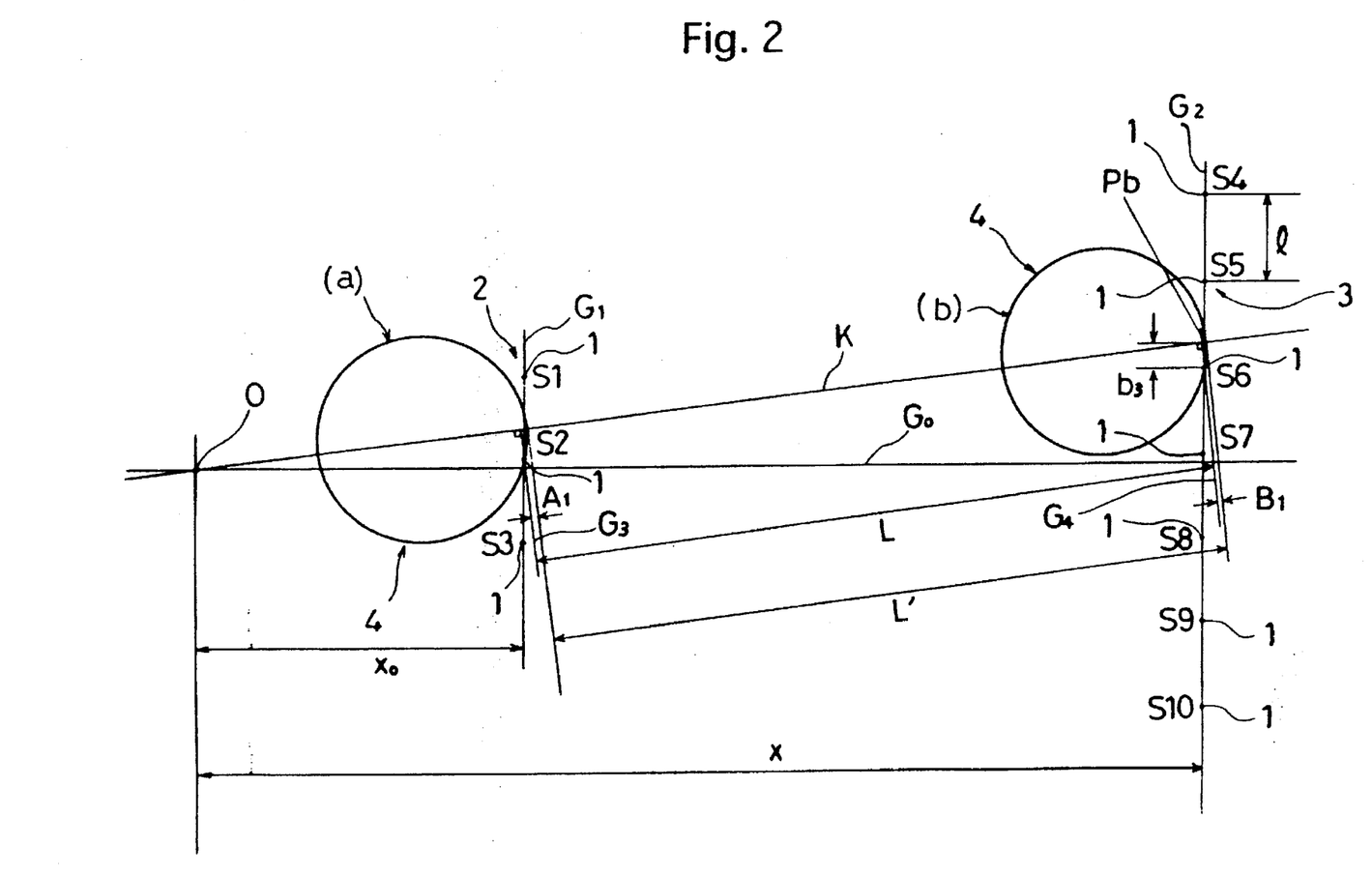
FIG. 2 is a first explanatory view for the arithmetic operation method.

The sensors 1 of the first group of sensors 2 and the sensors 1 of the second group of sensors 3 are respectively arranged at definite intervals on two parallel straight lines $G_1$ and $G_2$ as shown in FIG. 2, and the intervals l are arranged to be less than the radius r of the spherical object 4. That is to say, when the spherical object 4 passes above the first group of sensors 2 or the second group of sensors 3, the spherical object 4 intercepts at least two sensors 1 of the group of sensors.

The instrumentation means 5 having a plurality of counters (to be specific, a number one greater than the number of the sensors 1) measures the time when an output from an amplifier portion is less than a definite value (the time when an interception caused by the spherical object 4 begins) and the time length for which the output is less than the definite value (the time length of the interception), and inputs the data (the time and time length) into the arithmetic unit (the computer) 6. The amplifier portion performs automatic gain control so that an output is amplified to a definite electric power upon incidence of light from a projector into a sensor 1.

The arithmetic unit 6 calculates the velocity and instantaneous spatial position of the spherical object 4 on the basis of the data as explained below.

First, as shown in FIG. 2, defining $T_{s2}$ as the time when the spherical object 4 begins to intercept the sensor 1 of $S_2$ of the first group of sensors 2, and $T_{s6}$ as the time when the spherical object 4 begins to intercept the sensor 1 of $S_6$ of the second group of sensors 3, the following equation is obtained.

$$v \text{ (the velocity of the ball)} = L'/(T_{s6}-T_{s2})$$

In this case, L' is the actual distance the spherical object 4 moved from a situation of (a) to a situation of (b). (a) is the situation the spherical object 4 begins to intercept the sensor 1 of $S_2$, and (b) is the situation which the spherical object 4 begins to intercept the sensor 1 of $S_6$.

$A_1$ is the dimension the spherical object 4 protruding beyond the straight line $G_3$ when said spherical object 4 intercepts the sensor 1 of $S_2$ of the first group of sensors 2, and $B_1$ is the dimension the spherical object 4 protruding beyond the straight line $G_4$ when said spherical object 4 intercepts the sensor 1 of $S_6$ of the second group of sensors 3.

Figure 4:
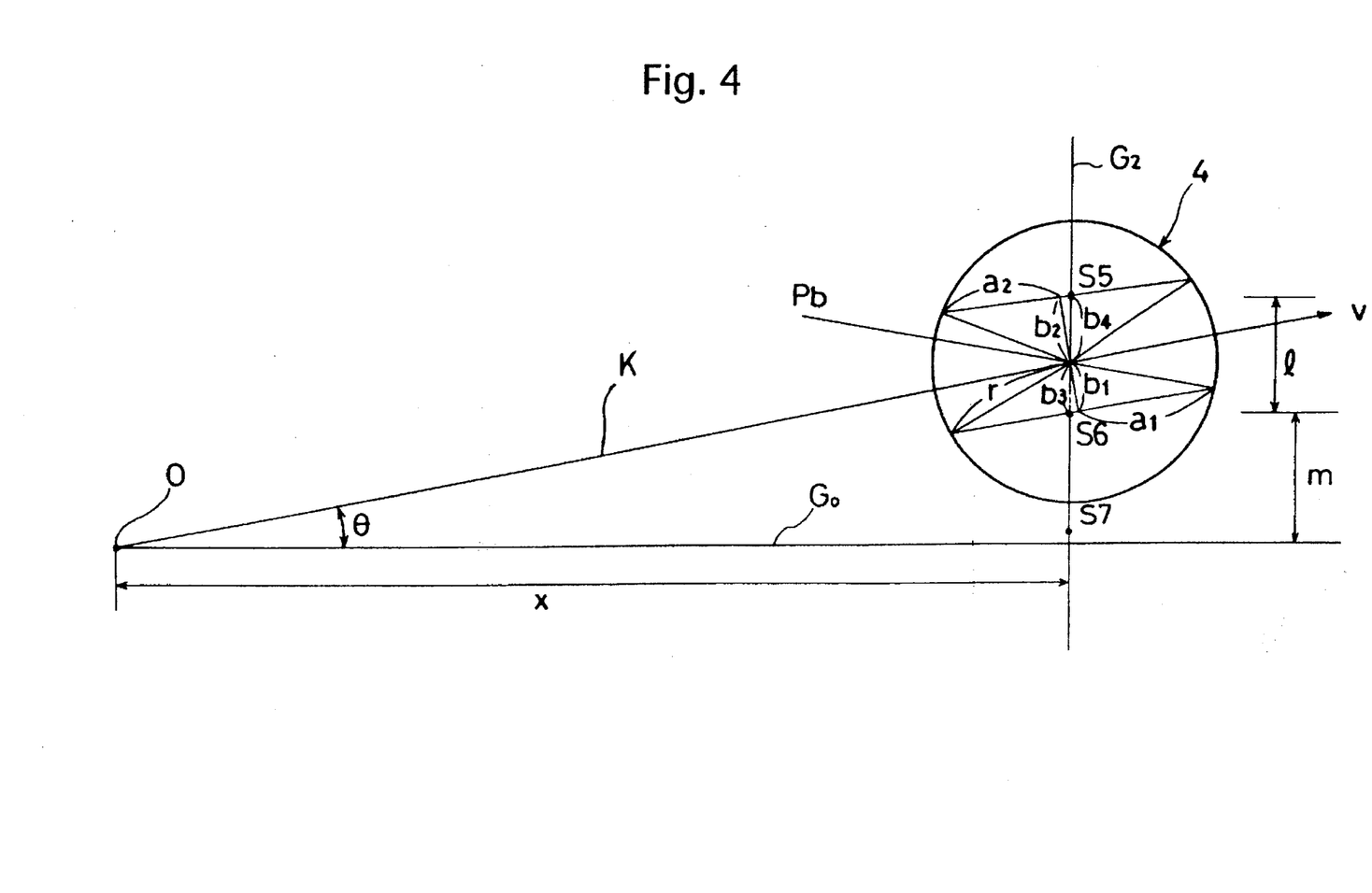
FIG. 4 is a third explanatory view for the arithmetic operation method.

The position where the spherical object 4 passes is obtained from the calculation method which is explained below with reference to FIG. 4.

Defining $t_1$ as the time length for which the spherical object 4 intercepts the sensor 1 of $S_6$, and $t_2$ as the time length for which the spherical object 4 intercepts the sensor 1 of $S_5$, the following equations are obtained.

$$a_1 = (½) v t_1$$

$$a_2 = (½) v t_2$$

$$a_1^2 + b_1^2 = r^2$$

$$a_2^2 + b_2^2 = r^2$$

$$b_3 + b_4 = l$$

$$b_1 = b_3 \cos \theta$$

$$b_2 = b_4 \cos \theta$$

$$\cos \theta = \frac{x}{\sqrt{x^2 + (m + b_3)^2}}$$

In this case, l is the intervals between the sensors 1, v is the velocity of the spherical object 4, r is the radius of the spherical object 4, θ is the lateral deviation angle (the angle between the datum line $G_0$ and the ball flying path K), and x is the distance from the shot point 0 to the straight line $G_2$.

From the foregoing eight equations, the following equation is obtained.

$$b_3 = \frac{-B \pm \sqrt{B^2 - AC}}{A}$$

In this equation, $$A = (x^2 - r^2)(t_2^2 - t_1^2)$$

$$B = lx^2 t_1^2 + mr^2(t_1^2 - t_2^2)$$

$$C = r^2(t_1^2 - t_2^2)(x^2 + m^2) - l^2 x^2 t_1^2$$

Therefore, x, r, l, and m (the distance from the datum line $G_0$ to the sensor $S_6$) are known quantities, and $b_3$ is obtained by measuring $t_1$ and $t_2$. When $b_3$ (the distance between $S_6$ and Pb) is obtained, $B_1$ shown in FIG. 2 is also obtained. The method for obtaining $B_1$ is going to be explained with reference to FIG. 3.

Figure 3:
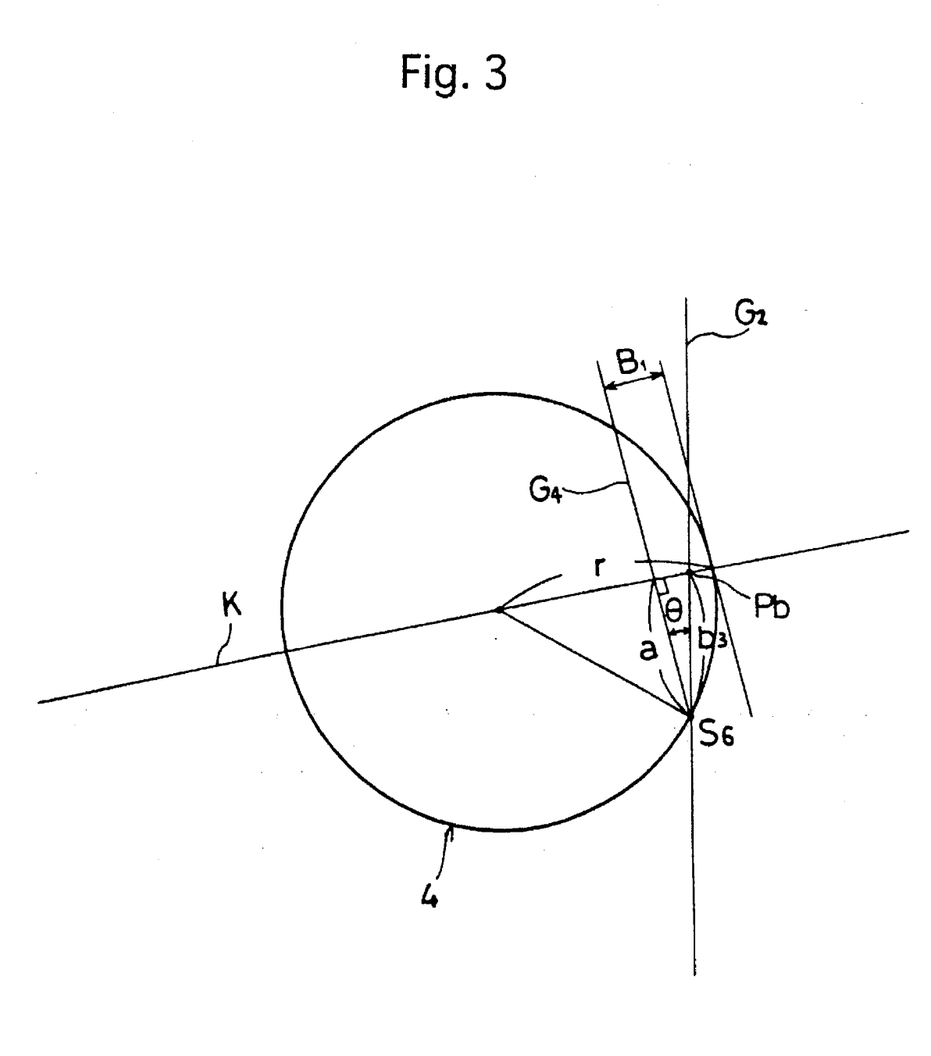
FIG. 3 is a second explanatory view for the arithmetic operation method.

$B_1$ is obtained from the following equation. By way of parenthesis, Pb is the point where the ball flying path K of the spherical object 4 intersects the straight line $G_2$.

$$B_1 = r - \sqrt{r^2 - a^2} \qquad (a = b_3 \cdot \cos \theta)$$

$$= r - \sqrt{r^2 - b_3^2 \cdot \cos^2 \theta}$$

$A_1$ in FIG. 2 is also obtained from the same equation as described above, and the actual distance L', for which the spherical object 4 moved, is obtained from the following equation.

$$L' = L - A_1 + B_1$$

The distance $x_0$ (see FIG. 2) from the shot point 0 to the straight line $G_1$, which is used in order to obtain $A_1$, is also a know quantity.

θ (the initial horizontal trajectory angle) is expressed by the following equation.

$$\theta = \tan^{-1} \frac{l'}{x}$$

In this case, $l' = m + b_3$.

Figure 5:
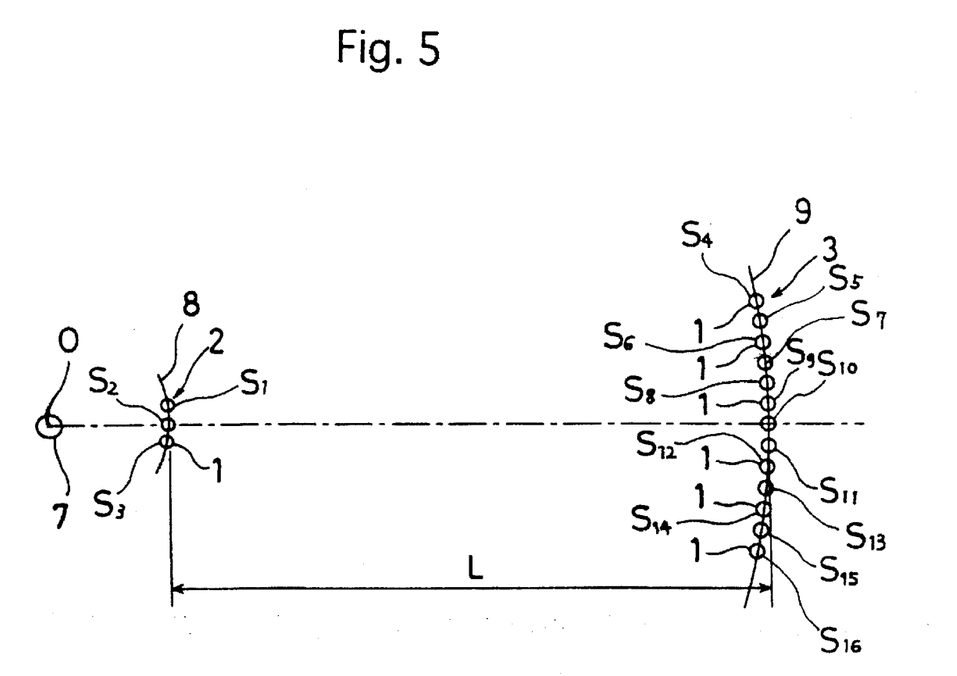
FIG. 5 is a schematic diagram showing another embodiment.

Next, FIG. 5 shows another preferred embodiment. In this case, sensors 1 of a first group of sensors 2 and sensors 1 of a second group of sensors 3 are respectively arranged at definite intervals on arcs of a first circle 8 and a second circle 9 which are centering around a shot point 0 (i.e. the center of a tee 7).

In this case, velocity and an instantaneous spatial position (an initial horizontal angle) of a spherical object 4 are obtained from the same method as the foregoing preferred embodiment.

Table 1 shows the results of an experiment, wherein a first group of sensors 2 and a second group of sensors 3 were arranged as shown in FIG. 5, a spherical object 4 (a golf ball) was launched from a shot point 0, and the times when the respective sensors 1 began to be intercepted and the time lengths of the respective interceptions were measured. $S_1$–$S_3$ are the sensors of the first group of sensors 2, and $S_4$–$S_{16}$ are the sensors of the second group of sensors 3.

TABLE 1

| Sensor No. | Ball No. 1 | | Ball No. 2 | | Ball No. 3 | |
|---|---|---|---|---|---|---|
| $S_1$ | 529 | 5883 | 432 | 6016 | 412 | 6093 |
| $S_2$ | 0 | 7113 | 0 | 7063 | 0 | 7098 |
| $S_3$ | 195 | 6584 | 272 | 6366 | 237 | 6454 |
| $S_4$ | 0 | 0 | 0 | 0 | 0 | 0 |
| $S_5$ | 0 | 0 | 0 | 0 | 0 | 0 |
| $S_6$ | 0 | 0 | 0 | 0 | 0 | 0 |
| $S_7$ | 0 | 0 | 0 | 0 | 0 | 0 |
| $S_8$ | 0 | 0 | 0 | 0 | 0 | 0 |
| $S_9$ | 0 | 0 | 68702 | 4037 | 69475 | 3648 |
| $S_{10}$ | 67856 | 6676 | 67225 | 7020 | 67797 | 7038 |
| $S_{11}$ | 67795 | 6872 | 67660 | 6145 | 68117 | 6416 |
| $S_{12}$ | 69938 | 2409 | 0 | 0 | 0 | 0 |
| $S_{13}$ | 0 | 0 | 0 | 0 | 0 | 0 |
| $S_{14}$ | 0 | 0 | 0 | 0 | 0 | 0 |
| $S_{15}$ | 0 | 0 | 0 | 0 | 0 | 0 |
| $S_{16}$ | 0 | 0 | 0 | 0 | 0 | 0 |

In Table 1, the left columns of Ball No. 1–Ball No. 3 are the times (×0.1 μsec.) when the sensors began to be intercepted, and the right columns are the time lengths (×0.1 μsec.) the sensors had been intercepted.

Table 2 shows the results of measurement according to a conventional method and measurement according to the present invention on the basis of the data (In this case, the intervals l between neighboring sensors are to be 14 mm, the radius of the spherical object 4 is to be 42.76 mm, and the distance between the shot point 0 and the second group of sensors 3 is to be 480 mm.).

TABLE 2

| Ball No. | Conventional Method | | Present Invention | |
|---|---|---|---|---|
| | Velocity of the Ball | Lateral Deviation Angle | Velocity of the Ball | Lateral Deviation Angle |
| 1 | 59.00 | 1.67 | 59.12 | 0.94 |
| 2 | 59.50 | 0.0 | 59.54 | 0.41 |
| 3 | 59.00 | 0.0 | 59.06 | 0.52 |

In the measurement according to the conventional method, the velocity of the ball was obtained from the time when the spherical object 4 began to intercept a sensor 1 which detected interception caused by the spherical object 4 first in the second group of sensors 3 and the distance between the first group of sensors 2 and the second group of sensors 3 (400 mm), and the lateral deviation angle θ (the initial horizontal trajectory angle) was obtained from the position of the sensor 1 which detected interception caused by the spherical object 4 first in the second group of sensors 3. In actuality, the balls No. 2 and No. 3 intercepted $S_{10}$ first, therefore the lateral deviation angles θ are 0.0°, and the ball No. 1 intercepted $S_{11}$ first, therefore the lateral deviation angle θ is 1.67°. This is because every neighboring sensor 1 of the second group of sensors 3 deviate by 1.67° when viewed from the shot point 0. As for accuracy of measurement in this case, errors in the direction of the ball flying path are ±0.2884 mm, and errors in the lateral direction are ±0.84°.

On the other hand, according to the present invention, the velocity and lateral deviation angle of the spherical object 4 were measured with high accuracy as shown in Table 2, and it is possible to avoid errors as the foregoing conventional method caused by calculating on the basis of the distance between the groups of sensors as the actual distance the spherical object 4 moved.

Regarding the sensors 1 of the first group of sensors 2 and the second group of sensors 3, they can be freely changed in number provided their positions are known and the intervals l between neighboring sensors 1 are less than the radius r of the spherical object 4 (i.e. provided the spherical object 4 intercepts at least two sensors 1 of the first group of sensors 2 and two sensors 1 of the second group of sensors 3 when the spherical object 4 passes above the groups of sensors 2, 3). The distance between the first group of sensors 2 and the second group of sensors 3 can also be freely changed provided the distance is sufficiently greater than the diameter of the spherical object 4 (i.e. provided the spherical object 4 passes above the second group of sensors 3 after passing above the first group of sensors 2).

Moreover, the radius of the first circle 8 where the first group of sensors 2 are disposed and the radius of the second circle 9 where the second group of sensors 3 are disposed can be freely changed provided the spherical object 4 intercepts at least two sensors 1 of the first group of sensors 2 and two sensors 1 of the second group of sensors 3 when the spherical object 4 passes above the groups of sensors 2, 3 and the spherical object 4 passes above the second group of sensors 3 after passing above the first group of sensors 2.

In the measuring apparatus and the measuring method according to the present invention, (passing) velocity and an (passing) instantaneous spatial position of a flying or moving object having a circular cross section such as a bottle or a can are measured with high accuracy. A transmission type ray projecting and receiving system is used in the embodiments, however, the same effect is obtained when a reflection type ray projecting and receiving system is used.

According to the present invention, velocity and an instantaneous spatial position of a flying or moving spherical object are easily measured with high accuracy. The apparatus as a whole does not become complicated, and the cost is low.

While preferred embodiments of the present invention have been described in this specification, it is to be understood that the invent on is illustrative and not restrictive, because various changes are possible within the spirit and indispensable features.

We claim:

1. An apparatus for simultaneously measuring velocity and an instantaneous spatial position of a spherical object comprising:

a first group of sensors consisting of a plurality of sensors arranged at first predetermined intervals, wherein each first predetermined interval is less than the radius of the spherical object;

a second group of sensors disposed at a predetermined distance from said first group of sensors and consisting of a plurality of sensors arranged at second predetermined intervals, wherein each second predetermined interval is less than the radius of the spherical object;

an instrumentation means for measuring the times when said spherical object begins to intercept energy beams detected by the sensors of the first and second groups of sensors and the time lengths of the respective interceptions; and an arithmetic unit for calculating the velocity and instantaneous spatial position of the spherical object on the basis of the times and time lengths measured by said instrumentation means.

2. The apparatus for simultaneously measuring velocity and an instantaneous spatial position of a spherical object as set forth in claim 1, wherein the sensors of the first group of sensors and the sensors of the second group of sensors are arranged in two parallel straight lines respectively.

3. The apparatus for simultaneously measuring velocity and an instantaneous spatial position of a spherical object as set forth in claim 1, wherein the sensors of the first group of sensors and the sensors of the second group of sensors are arranged on an arc of a first circle and an arc of a second circle, respectively, wherein each said circle is centered around a shot point.

4. The apparatus for simultaneously measuring velocity and an instantaneous spatial position of a spherical object as set forth in claim 1, wherein the sensors of the first group of sensors and the sensors of the second group of sensors are light sensors for detecting light energy from projectors.

5. The apparatus for simultaneously measuring velocity and an instantaneous spatial position of a spherical object as set forth in claim 1, wherein said spherical object is a golf ball.

6. The apparatus for simultaneously measuring velocity and an instantaneous spatial position of a spherical object as set forth in claim 1, wherein said spherical object is a tennis ball.

7. A method for simultaneously measuring velocity and an instantaneous spatial position of a spherical object in which a first group of sensors and a second group of sensors each consisting of a plurality of sensors arranged at predetermined intervals, each predetermined interval being less than the radius of the spherical object, are disposed at a predetermined distance between the first and second groups, comprising the steps of:

measuring the times when said spherical object begins to intercept energy beams detected by the sensors in both the first and second groups of sensors and the time lengths of the respective interceptions, and calculating the velocity and instantaneous spatial position of the spherical object on the basis of the measured times and time lengths.

8. The method for simultaneously measuring velocity and an instantaneous spatial position of a spherical object as set forth in claim 7, wherein said spherical object is a golf ball.

9. The method for simultaneously measuring velocity and an instantaneous spatial position of a spherical object as set forth in claim 7, wherein said spherical object is a tennis ball.

* * * * *